US005970165A

United States Patent [19]
Itako

[11] Patent Number: 5,970,165
[45] Date of Patent: Oct. 19, 1999

[54] PAPER DISCRIMINATING DEVICE INCLUDING PEAK COUNTING AND ANALYSIS

[75] Inventor: Eiji Itako, Sakado, Japan

[73] Assignee: Kabushiki Kaisha Nippon Conlux, Tokyo, Japan

[21] Appl. No.: 08/611,648

[22] Filed: Mar. 6, 1996

[30] Foreign Application Priority Data

Mar. 6, 1995 [JP] Japan .................................. 7-045809

[51] Int. Cl.[6] ................................................ G06K 9/00
[52] U.S. Cl. ............................ 382/135; 194/209; 902/7
[58] Field of Search .................................. 382/135, 137, 382/138, 140, 171, 218, 273, 106; 209/534, 4; 902/7; 194/205–213; 235/379; 250/548; 356/71

[56] References Cited

U.S. PATENT DOCUMENTS

| | | | |
|---|---|---|---|
| 4,588,292 | 5/1986 | Collins | 356/71 |
| 4,749,087 | 6/1988 | Buttifant | 209/534 |
| 5,014,857 | 5/1991 | Kondo | 209/534 |
| 5,199,543 | 4/1993 | Kamagami et al. | 194/207 |
| 5,301,786 | 4/1994 | Yoshihara | 194/207 |
| 5,367,577 | 11/1994 | Gotaas | 382/135 |
| 5,379,093 | 1/1995 | Hashimoto et al. | 355/201 |
| 5,437,357 | 8/1995 | Ota et al. | 194/206 |
| 5,467,405 | 11/1995 | Raterman et al. | 382/135 |
| 5,548,110 | 8/1996 | Storch et al. | 235/472 |
| 5,564,548 | 10/1996 | Dobbins et al. | 194/317 |

FOREIGN PATENT DOCUMENTS

| | | |
|---|---|---|
| 55-9284 | 1/1980 | Japan . |
| 56-149685 | 11/1981 | Japan . |
| 58-56088 | 4/1983 | Japan . |
| 60-35716 | 8/1985 | Japan . |
| 61-204795 | 9/1986 | Japan . |
| 62-211792 | 9/1987 | Japan . |
| 62-242291 | 10/1987 | Japan . |
| 63-106094 | 5/1988 | Japan . |
| 63-62790 | 12/1988 | Japan . |
| 645354 | 1/1989 | Japan . |
| 6411995 | 2/1989 | Japan . |
| 1261798 | 10/1989 | Japan . |
| 2753 | 1/1990 | Japan . |
| 2167490 | 6/1990 | Japan . |

*Primary Examiner*—Jon Chang
*Assistant Examiner*—Jayanti K. Patel
*Attorney, Agent, or Firm*—Loeb & Loeb LLP

[57] ABSTRACT

A papers discriminating device which improves the accuracy in true or false judgment of imitation papers which are made by pasting parts of genuine papers on other papers. To a conventional process, a process is added in which the colors and shades of paper detected by a sensor are taken and analyzed by a CPU, the number of peaks of the entire shades and characteristic parts of the paper is examined for truth or falsehood by the CPU on the basis of the number of peaks of the shades, a ratio of peak level difference, and a combination pattern of the peak position and peak level.

3 Claims, 5 Drawing Sheets

| NO. | PATTERN NAME | PATTERN CHARACTERISTICS | PATTERNS |
|---|---|---|---|
| 1 | N SHAPE-1 | WITH SECTION + MAXIMUM VALUE AS DETECTION REFERENCE, FOLLOWING – MINIMUM VALUE IS JUDGED. |  + PEAK MAXIMUM VALUE REFERENCE<br>– PEAK MINIMUM |
| 2 | N SHAPE-2 | WITH SECTION + YOUNGER ADDRESS UP TO SECOND MAXIMUM VALUE AS DETECTION REFERENCE, FOLLOWING – MINIMUM VALUE IS JUDGED. | 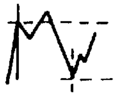 +PEAK MAXIMUM REFERENCE SECOND FRONT<br>– PEAK MINIMUM |
| 3 | N SHAPE-3 | WITH SECTION – MINIMUM VALUE AS DETECTION REFERENCE. + MAXIMUM VALUE ON YOUNGER POSITION SIDE IS SEARCHED TO MAKE JUDGMENT. |  + PEAK FRONT<br>– PEAK MINIMUM REFERENCE |
| 4 | INVERTED N SHAPE-n | WITH SECTION – MINIMUM VALUE AS DETECTION REFERENCE, FOLLOWING + MAXIMUM VALUE IS JUDGED. VARIATIONS CONFORM WITH N SHAPE. | 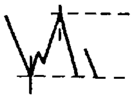 + PEAK BEHIND<br>– PEAK MINIMUM REFERENCE |
| 5 | W SHAPE-n | WITH SECTION + MAXIMUM VALUE AS DETECTION REFERENCE, – PEAK MINIMUM VALUES ON BOTH SIDES ARE SEARCHED AND JUDGED. | 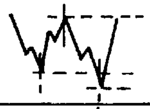 + PEAK MAXIMUM REFERENCE<br>– PEAK BOTH SIDES |
| 6 | M SHAPE-n | WITH SECTION – MINIMUM VALUE AS DETECTION REFERENCE, + PEAK MAXIMUM VALUES ON BOTH SIDES ARE SEARCHED AND JUDGED. | 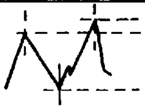 + PEAK BOTH SIDES<br>– PEAK MINIMUM REFERENCE |
| 7 | V SHAPE-n | ONLY – MINIMUM VALUE PART IN SECTION IS JUDGED. | 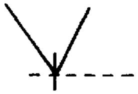 – PEAK MINIMUM JUDGMENT |
| 8 | INVERTED V SHAPE-n | ONLY + MAXIMUM VALUE PART IN SECTION IS JUDGED. | 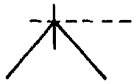 + PEAK MAXIMUM JUDGMENT |

FIG.5

PAPER DISCRIMINATING DEVICE INCLUDING PEAK COUNTING AND ANALYSIS

BACKGROUND OF THE INVENTION

1. Field of the Invention

The invention relates to a bill discriminating device for automatic vending machines, money exchange machines and video game machines, and relates to a papers discriminating device for determining patterns and others printed on money tickets, boarding passes and others.

2. Description of the Invention

Discriminating devices are used to detect by means of optical sensors and magnetic sensors the colors and shades of each part of bills and money tickets and the presence of magnetic powder which is contained in bills when papers such as bills and money tickets are being transferred, and compare the detected data with a reference data pattern to judge the kind and genuineness of bills.

Such a process is designed to output the genuine note signal for a type of papers such as bills or money tickets according to the reference data pattern only when all the values of data sampled at respective positions are within a permissible range of the reference data pattern. To remove an imitation note without fail, a permissible range is required to be narrowed, but if it is excessively narrowed, a genuine note might be misjudged as an imitation note due to dirt and wrinkles of paper when detection is optically made, uneven shades of printed colors, a shear in printing, or a positional error of paper when crossing by an optical sensor. Therefore, evaluation and judgment are required to be made based on the distribution of patterns containing all dispersion.

Consequently, there is a disadvantage that imitation papers which are made by pasting parts of genuine papers on other papers or a piece of paper cannot be judged correctly.

SUMMARY OF THE INVENTION

The invention aims to remedy the above disadvantages and to improve the accuracy of judging that imitation papers which are made by pasting parts of genuine papers on other papers are not genuine by examining partly notable characteristics of the papers and by eliminating the danger of judging a genuine note as a false note.

To complete the above objects, the invention provides a papers discriminating device comprising: measured data storage means for reading and storing data measured from paper at a plurality of measuring positions; peak value analyzing means for analyzing peak values of the measured data on an entire paper, positions where the peak values have appeared, and the number of times that the peak values have appeared in view of the measured data stored in the measured data storage means; and first abnormal bill judging means for judging the paper as an abnormal bill when a number of times of peak values in the entire paper analyzed by the peak value analyzing means is not within a predetermined number of times.

In addition to the above configuration, the invention comprises second abnormal bill judging means for judging the paper as an abnormal bill when peak values appeared in a predetermined characteristic area of the paper analyzed by the peak value analyzing means are not within a predetermined number of times.

Besides, the invention also comprises first calculation means for obtaining a first calculated value corresponding to a difference between a maximum value and a minimum value of the peak values in the entire paper analyzed by the peak value analyzing means; second calculation means for obtaining a second calculated value corresponding to a difference between a maximum value and a minimum value of the peak values in a predetermined characteristic area of the paper analyzed by the peak value analyzing means; third calculation means for calculating a ratio of the second calculated value obtained by the second calculation means to the first calculated value obtained by the first calculation means; and third abnormal bill judging means for judging the paper as an abnormal bill when the ratio calculated by the third calculation means is not within a prescribed value.

And, the invention also comprises fourth abnormal bill judging means for comparing an appearance pattern of peak values in a predetermined characteristic area of the paper analyzed by the peak value analyzing means with an appearance pattern of peak values corresponding to the predetermined characteristic area, and judging an abnormal bill from comparison results.

Further, the invention comprises measured data storage means for reading and storing data measured at a plurality of measuring positions of a paper; papers judging means for judging whether the paper is genuine or not by comparing the measured data stored in the measured data storage means and predetermined values corresponding to the measuring positions; peak value analyzing means for analyzing, based on the measured data stored in the measured data storage means, peak values of the measured data on an entire paper, positions where the peak values have appeared and a number of times that the peak values have appeared; first abnormal bill judging means for judging the paper as an abnormal bill when the number of times the peak values in the entire paper analyzed by the peak value analyzing means is not within a predetermined number of times; second abnormal bill judging means for judging the paper as an abnormal bill when a number of times of the peak values appeared in a predetermined characteristic area of the paper analyzed by the peak value analyzing means is not within a predetermined number of times; third abnormal bill judging means for judging the paper as an abnormal bill when a ratio of a difference between the maximum and minimum values of the peak values in the predetermined characteristic area of the paper analyzed by the peak value analyzing means to a difference between the maximum and minimum values of the peak values in the entire paper analyzed by the peak value analyzing means is not within a prescribed range; and fourth abnormal bill judging means for comparing an appearance pattern of peak values in the predetermined characteristic area of the paper analyzed by the peak value analyzing means with an appearance pattern of peak values corresponding to the predetermined characteristic area, wherein the paper is judged as an abnormal bill when the paper which has been judged as a genuine note by the papers judging means is judged as an abnormal bill by any one of the first to fourth abnormal bill judging means.

To examine papers, the invention adds to a conventional process a process that can judge the peak position and peak number of times of the entire shades of the paper, difference among peak levels, and characteristic parts of the paper on the basis of the peak position and peak number of times of the shades, a ratio of peak level difference, and a combination pattern of the peak position and peak level.

Thus, the invention can improve an appraising rate of altered papers which are made by pasting parts of genuine papers on other papers, by a relatively simple judging method.

BRIEF DESCRIPTION OF THE DRAWINGS

FIG. 5 is a table showing one example of the characteristic patterns used in the characteristic zone analysis of FIG. 4.

DESCRIPTION OF THE PREFERRED EMBODIMENTS

A papers discriminating device of the invention will be described in detail with reference to the accompanying drawings.

Figure 1:
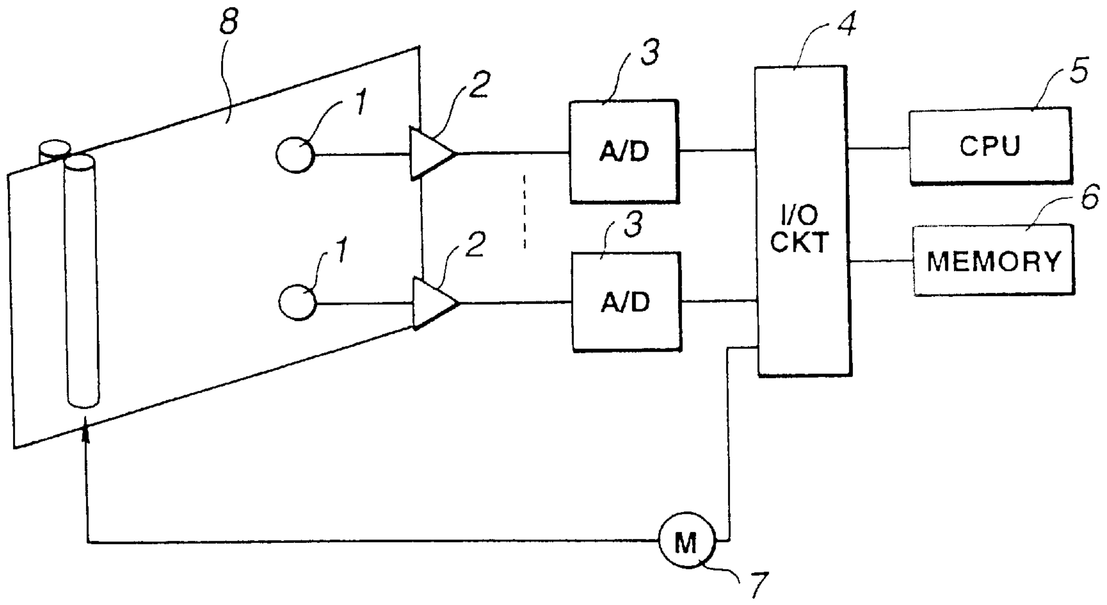
FIG. 1 is a block diagram showing the schematic configuration of a papers discriminating device for effecting the invention.

FIG. 1 is a block diagram schematically showing a papers discriminating device for effecting the invention.

Output from a sensor 1 such as a photoelectric converter is converted into a digital signal by an A/D converter 3 via an amplifier 2 and entered a CPU 5 via an I/O circuit 4. Thus, information on colors and shades of paper 8 being detected by the sensor 1 is taken into the CPU 5. The position of the paper 8 is controlled by a motor 7 which is controlled by the CPU 5, so that the positional information on the paper 8 and the information from the sensor 1 can be comparatively taken by the CPU 5 and stored in a memory 6.

A combination of the sensor 1, the amplifier 2 and the A/D converter 3 may be one or two or more. And, the sensor 1 may be a magnet detecting sensor.

Figure 2:
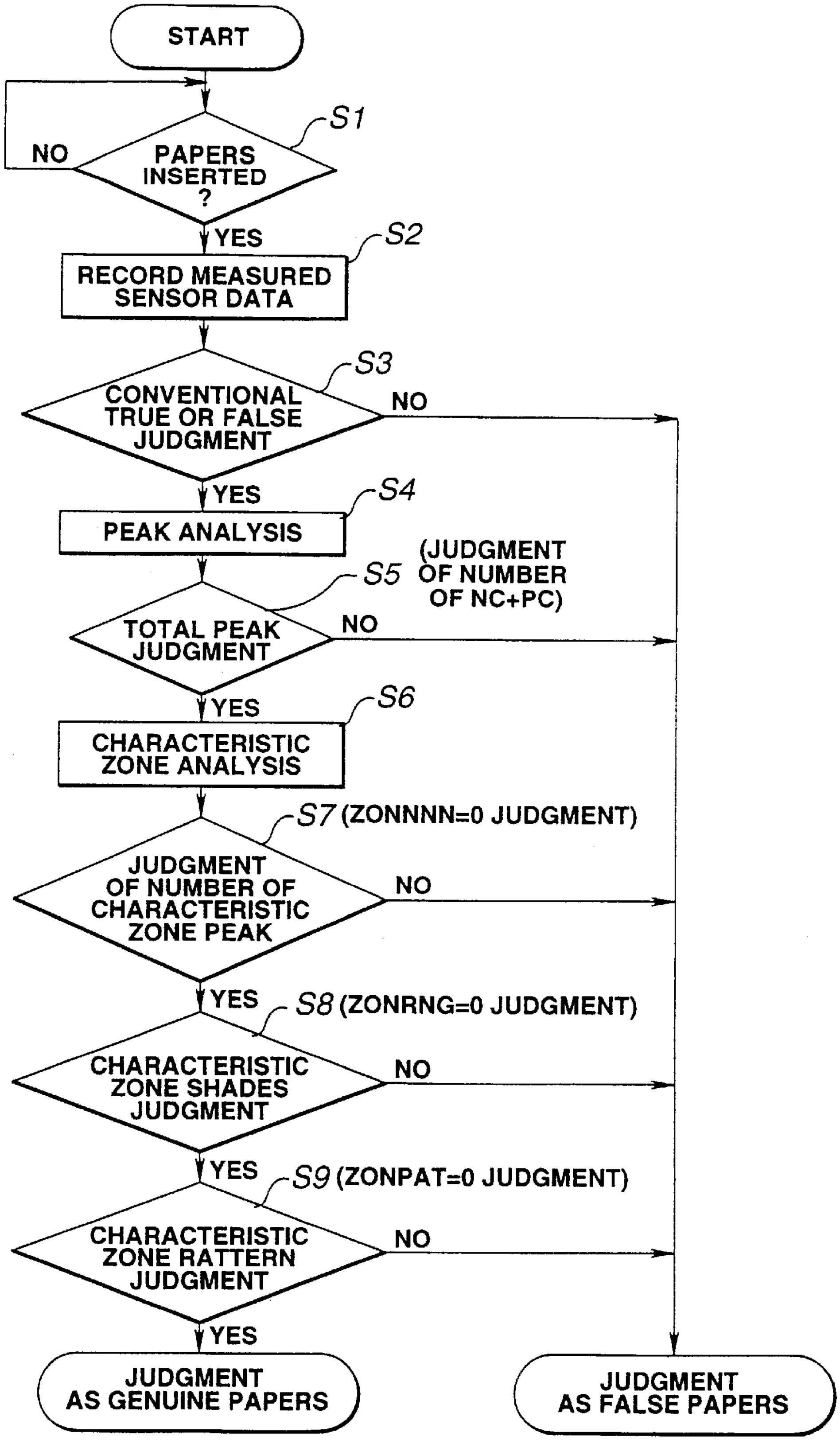
FIG. 2 is a basic flowchart showing the operation of a papers discriminating device according to the invention.
Figure 3:
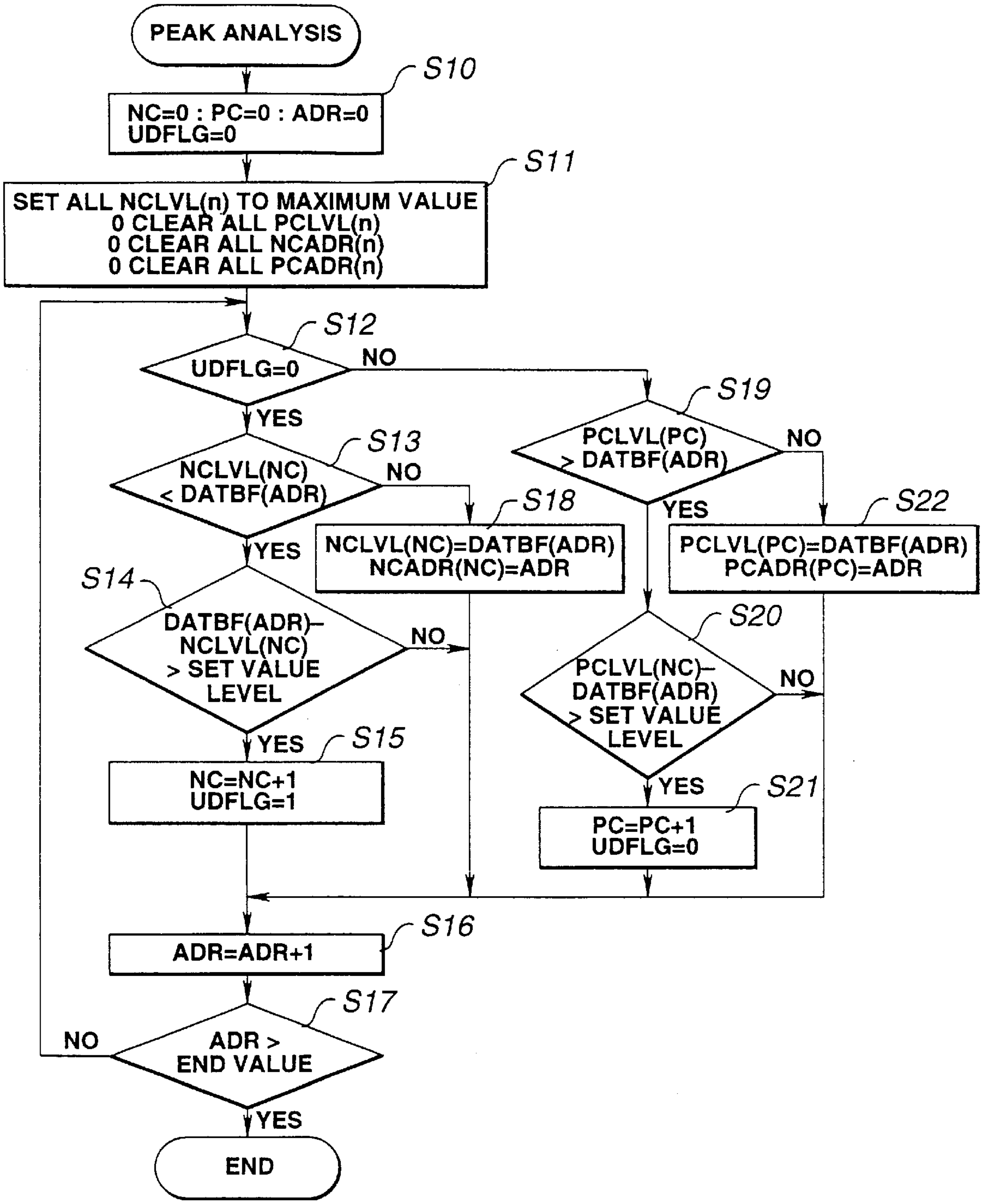
FIG. 3 is a detailed flowchart showing the details of the peak analysis in the basic flowchart of FIG. 2.
Figure 4:
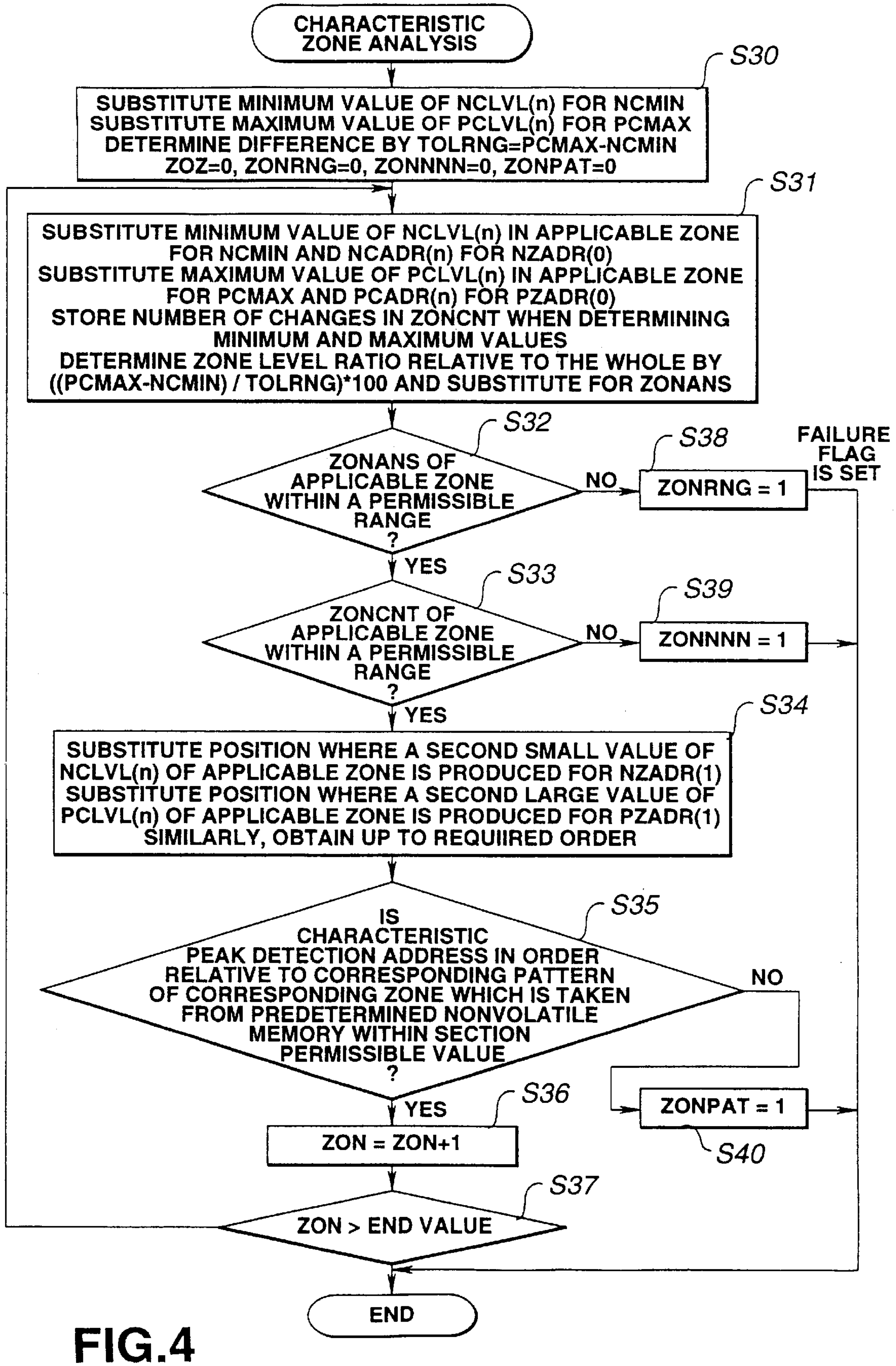
FIG. 4 is a detailed flowchart showing the details of the characteristic zone analysis in the basic flowchart of FIG. 2.

FIG. 2 to FIG. 4 are schematic flowcharts of the operation of the papers discriminating device of the invention. It is to be understood that these flowcharts are used to describe the contents of the invention and do not always describe the detailed operation of an actual papers discriminating device.

FIG. 2 is a so-called general flowchart of the invention.

It is seen in FIG. 2 that when a paper is inserted, the insertion itself is checked first (step 1). Then, measured data on each part of the paper by the sensor is stored in DATBF (N) of the memory (step 2). Judgment is then made by a conventional judging method (step 3). When the paper is judged to be genuine by the conventional judging method, they are subjected to a peak analysis (step 4). The peak analysis (step 4) will be described afterward in detail with reference to FIG. 3, but in brief, the peak analysis determines in combination measured data and positions of positive and negative peak values of measured data by the sensor indicating the changes in shades of the paper and stores a changed number of times of the negative peak NC and a changed number of times of the positive peak PC. When the paper is judged to be not genuine, they are judged to be abnormal paper.

Comprehensive peak judgment (step 5) judges whether a total (NC+PC) of the number of positive and negative peaks is within a prescribed reference range of changed number of times which has been determined in connection with the subject paper.

When the changed number of times is within the reference permissible range, a characteristic zone analysis (step 6) is effected. When it is not within the reference permissible range, the paper is judged to be abnormal paper.

The characteristic zone analysis (step 6) judges and analyzes the peak, level ratio and pattern of a certain characteristic point (characteristic zone) on the paper and sets the results at each flag. Details of this step will be described afterward with reference to FIG. 4.

Following the characteristic zone analysis (step 6), the number of characteristic zone peaks is judged (step 7).

The judgment of characteristic zone peak number of times (step 7) judges whether a total of the number of positive and negative peaks in the measured data by the sensor in the characteristic zone which have been determined by the analysis in the characteristic zone analysis (step 6) is within a permissible range determined in advance. When the total of the number of peaks in the measured data by the sensor in the characteristic zone by the judgment of characteristic zone peak number of times (step 7) is within the permissible range, a characteristic zone shade judgment (step 8) is performed.

When a judgment flag ZONRNG is 0 as a result of the characteristic zone analysis (step 6), the characteristic zone shade judgment (step 8) judges the paper to be acceptable, and the process is advanced to a pattern judgment of characteristic zone (step 9). When the judgment flag ZONRNG is not 0, the paper is judged to be abnormal paper.

The pattern judgment of characteristic zone (step 9) finally judges the paper to be a genuine paper when a judgment flag ZONPAT is 0 as a result of the characteristic zone analysis (step 6). And, when the judgment flag ZONPAT is not 0, the paper is judged to be an abnormal paper.

Now, the contents of the peak analysis (step 4) will be described with reference to FIG. 3.

To effect this peak analysis, several memory areas or buffers are provided as follows.

| | |
|---|---|
| NC | Counter for negative peak number |
| PC | Counter for positive peak number |
| ADR | Measured data position by sensor on paper |
| UDFLG | Positive/negative direction detection flag |
| NCLVL(n) | Negative peak level storage level |
| NCADR(n) | Negative peak detection position (pair with NCLVL(n)) |
| PCLVL(n) | Positive peak level storage level |
| PCADR(n) | Positive peak detection position (pair with PCLVL(n)) |
| DATBF(ADR) | Storage location of data on paper measured by sensor |
| Setting level | Detects the peak of smaller changes as a value and a numerical value for setting the extent to which a change is detected are smaller. |
| End value | End value of paper sensor data |

In the peak analysis, values of NC, PC, ADR and UDFLG are set to 0 (step 10), the maximum value is set for every NCLVL (n), and PCLVL (n), NCADR (n) and PCADR (n) are cleared to 0 (step 11).

In step 12, then, when the UDFLG value is 0 and in a state of lowering from the positive peak to the negative peak, the process is advanced to step 13, and when it is other than 0 (i.e., 1), the step is advanced to step 19.

Step 13 compares the value of NCLVL (NC) which has been determined to be the minimum value of the paper sensor data value up to present and the present paper sensor-measured data DATBF (ADR). When the present paper sensor-measured data is larger, the process is advanced to step 14, the value of NCLVL (NC) which has been determined to be the minimum value of the paper sensor data value up to present is kept as it is, the value of NCLVL (NC) and the present paper sensor-measured data DATBF (ADR) are compared to see a difference, and when the difference between them is larger than the "set level", it is determined that a new negative peak value has been detected and the counter NC of the negative peak number is increased by one, and the UDFLG is set to 1 to indicate a state rising from the negative peak to the positive peak.

In step 16, the ADR is advanced by 1, and the next position is detected. In step 17, the ADR is compared with the end value, and when the ADR is larger, the process is terminated, but if not, the process is returned to step 12.

When the present paper sensor-measured data DATBF (ADR) is smaller in step 13, the process is advanced to step 18, the present paper sensor-measured data DATBF (ADR) is determined to be a negative peak value NCLVL (NC), and the present address ADR is stored as a negative peak value address NCADR (NC). The process is then advanced to step 16.

Step 19 compares the value PCLVL (PC) which has been determined to be the maximum value of the paper sensor data value up to present and the present paper sensor-measured data DATBF (ADR) to see a difference. When the present paper sensor-measured data is smaller, the process is advanced to step 20, the value PCLVL (ADR) which has been determined to be the maximum value of the paper sensor data value up to present is kept as it is, the value PCLVL (ADR) and the present paper sensor-measured data DATBF (ADR) are compared to see a difference, and when the difference between them is larger than the "set level", it is determined that a new positive peak value is detected and the counter PC of the positive peak number is increased by one, and the UDFLG is set to 0 to indicate a state lowering from the positive peak to the negative peak. Then, the process is advanced to step 16.

When the present paper sensor-measured data DATBF (ADR) is larger in step 19, the process is advanced to step 22, the present paper sensor-measured data DATBF (ADR) is determined to be a positive peak value PCLVL (PC), and the present address ADR is stored as a positive peak value address PCADR (PC). The process is then advanced to step 16.

Thus, the peak value is detected by performing the flowchart of FIG. 3.

The operation of the characteristic zone analysis (step 6) will be described with reference to the flowchart of FIG. 4. This analysis is performed to detect the characteristics in a certain range of paper.

To effect this analysis, several memory areas or buffers are provided as follows.

| | |
|---|---|
| NCMIN | Minimum value of entire peak value level at negative peak point |
| PCMAX | Maximum value of entire peak value level at positive peak point |
| TOLRNG | Value of (PCMAX − NCMIN) |
| ZON | Analysis order of characteristic zone |
| ZONANS | Ratio of a difference between the maximum and minimum values of the peak level in the zone and a difference between the maximum and minimum values of the entire peak level |
| ZONCNT | Sum of the number of maximum and minimum values in the characteristic zone |
| ZONRNG | Failure flag when ZONANS is outside of the specified range. |
| ZONNNN | Failure flag when ZONCNT is outside of the specified range. |
| ZONPAT | Failure flag when characteristic pattern judgment is outside of the specified range. |

-continued

| | |
|---|---|
| NZADR (n) | Detection position of a point that the negative peak value level indicates n plus the first minimum value. |
| PZADR (n) | Detection position of a point that the positive peak value level indicates n plus the first maximum value. |

In step 30, the minimum value of the entire peak value level NCLVL (n) of a negative peak point determined in the peak analysis (step 4) is stored in NCMIN and the maximum value of the peak value level PCLVL (n) of a positive peak point in PCMAX, and (PCMAX—NCMIN) is calculated and stored in TOLRNG. And, ZON, ZONRNG, ZONNNN and ZONPAT are set to 0 and initialized.

In step 31, the minimum value of the negative peak value level NCLVL (n) in the zone subjected to the analysis is stored in NCMIN and the maximum value of the positive peak value level PCLVL (n) in PCMAX, NCADR (n) indicating the detection position of a point where the negative peak value level indicates the minimum value is stored in NZADR (0) and PCADR (n) indicating the detection position of a point where the positive peak value level indicates the maximum value in PZADR (0). And, sum of the number of maximum and minimum values in the zone is stored in ZONCNT. Furthermore, a difference between the maximum and minimum values at the peak level in the zone is compared with a difference between the maximum and minimum values at the entire peak level to obtain a zone level ratio as follows, and it is stored in ZONANS.

((PCMAX—NCMIN)/TOLRNG)*100

Step 32 checks whether the value of ZONANS in this zone is within the permissible range, and if so, the process is advanced to step 33, but if not, the process is advanced to step 38. Step 38 sets the failure flag of ZONRNG to 1 and terminates the process.

Step 33 checks whether the value of ZONCNT in this zone is within the permissible range, and if so, the process is advanced to step 34, but if not, the process is advanced to step 39. Step 39 sets the failure flag of ZONNNN to 1 and terminates the process.

Step 34 sorts the second and later of the positive and negative peak values in descending or ascending order, and stores the detection position in PZADR (1) and NZADR (1) or later. The number of detection positions of the peak value to be stored is variable according to the subject characteristic pattern. It is assumed to be up to the second for positive and negative peak values.

Then, the process is advanced to step 35 to effect a characteristic position detecting judgment according to the order. This judgment is performed by characteristically classifying the appearing patterns of the peak values in view of the peak values determined in step 31 and step 34 and their order and determining whether the detected peak values are within the permissible range of the positive and negative peak positions determined by the characteristic patterns specified in advance.

The characteristic patterns are exemplified in FIG. 5 and judged by applying to any one of 8 types or more of standard patterns based on the order of the peak magnitudes and the detected positions. The detected pattern of a peak in each zone is applied to these standard patterns and optimized and stereotyped with the deviation of the paper and the detection device taken into consideration.

When the detected result is within the permissible range of the deviation of the reference pattern determined in advance by the actual measurement of standard paper with respect to each zone, the process is advanced to step 36, and if not, the process is advanced to step 40. Step 40 sets the failure flag of ZONPAT to 1 and the process is terminated.

Step 36 adds 1 to a zone number ZON, and the process is advanced to step 37 to analyze the next zone. Step 37 judges whether all characteristic zones have been analyzed, and if the analysis has not been completed, the process is returned to step 31, and the next zone is analyzed. When all characteristic zones have been analyzed, this process is terminated.

Variations of the characteristic patterns of FIG. 5 will be described briefly.

In the drawing, No. 1 designates a pattern which is referred to as "Letter N type—1", and the maximum value of a positive peak in a section is determined first, and it is used as a reference to judge the minimum value of a negative peak.

No. 2 is a pattern which is referred to as "Letter N type—2", and one with a lower address is determined between the first and second maximum values of a positive peak in a section, and it is used as a reference to judge the minimum value of a negative peak.

No. 3 is a pattern which is referred to as "Letter N type—3", the minimum value of a negative peak in a section is determined, and it is used as a reference to judge the maximum value of a positive peak on a lower position side.

No. 4 is a pattern which is referred to as "Inverted letter N type—n", the minimum value of a negative peak in a section is determined, and it is used as a reference to judge the maximum value of a positive peak. This pattern has the same three judging types as the "Letter N type".

No. 5 is a pattern which is referred to as "Letter W type—n", the maximum value of a positive peak in a section is determined, and it is used as a reference to judge the minimum value of a negative peak on the side opposite from the lower address side.

No. 6 is a pattern which is referred to as "Letter M type—n", the minimum value of a negative peak in a section is determined, and it is used as a reference to judge the maximum value of a positive peak on the side opposite from the lower address side.

No. 7 is a pattern which is referred to as "Letter V type—n", and only the minimum value of a positive peak in a section is judged.

No. 8 is a pattern which is referred to as "Inverted letter V—n", and only the maximum value of a positive peak in a section is judged.

The characteristic patterns are not limited to the above examples, and any pattern which is easiest to express and judge according to the actually measured pattern may be selected.

The invention detects the colors and shades on each part of the paper and the presence of magnetic powder included by an optical sensor and a magnetic sensor when the paper is moved, judges data, which is obtained by reading the detected level by the A/D converter, by a prior art to judge the paper as a genuine paper, then the process of the invention is performed. In the process of the invention, the number of positive and negative peaks of the detected data and the appeared positions are stored, and the number of peaks and the levels are simply compared with reference values, and the characteristic parts (characteristic zones) of the paper are used for judgment.

The process of this invention consists of the following items.

1) Number of changes in shade on the entire area Number of positive and negative peaks of shade levels is judged.

2) Judgment of shades on the details of each characteristic zone with respect to the entire shades The maximum value of positive peaks and the minimum value of negative peaks of shade levels in each of finely divided characteristic zones of the paper are determined. A ratio of a difference between the above maximum and minimum values to a difference between the maximum value of a positive peak and the minimum value of a negative peak of the entire shade level is determined for judgment.

3) Judgment of the number of shades in each characteristic zone

The number of positive and negative peaks of shade levels on each of the finely divided characteristic zones of paper is judged.

4) Judgment of characteristic pattern of shade distribution in each characteristic zone The characteristic patterns of shade distribution are stereotyped and judged in view of the peak level and appearance position in each of the finely divided characteristic zones of paper.

The invention adds to a conventional process a process that judges the peak position and peak number of times of the entire shades of the paper, difference among peak levels, and characteristic parts of the paper on the basis of the peak position and peak number of times of the shades, a ratio of peak level difference, and a combination pattern of the peak position and peak level.

Thus, the invention can improve an appraising rate of altered papers which are made by pasting parts of genuine papers on other papers, by a relatively simple judging method.

What is claimed is:

1. A paper discriminating device comprising:

measured data reading means, responsive to insertion of a paper, for sequentially reading measured data at a plurality of measurement positions over a measurement area of an entire paper, the measurement positions spaced along a longitudinal direction of the paper;

measured data storage means for sequentially storing the measured data of each of the measurement positions read by the measured data reading means in association with each of the measurement positions;

first judging means for judging genuineness of the paper by comparing the measured data of each of the measurement positions stored in the measured data storage means with a reference value previously set in association with each of the measurement positions;

peak value analyzing means for determining positive peak values and negative peak values of the measured data by comparing the measured data of each of the measurement positions read by the measured data reading means with the measured data already stored in the measured data storage means;

second judging means for counting the number of the positive peaks and the negative peaks determined by the peak value analyzing means and judging the genuineness of the paper by comparing the count value with a previously set reference count value; and third judging means dividing the measurement area into a plurality of blocks, the third judging means for judging genuineness of the paper on the basis of a peak appearance pattern in each block and on the basis of a relative concentration in each divided block with respect to an entire concentration of the paper, the third judging means including:

fourth judging means for judging the genuineness of the paper based on whether or not a ratio of a difference between maximum measured data of the positive peaks and minimum measured data of the negative peaks in each block to a difference between the maximum measured data of the positive peaks and the minimum measured data of the negative peaks in the entire paper determined by the peak value analyzing means is within a range of a first allowable value previously set in association with each block;

fifth judging means for judging the genuineness of the paper based on whether or not the numbers of positive peaks and negative peaks in each block determined by the peak value analyzing means are within a range of a second allowable value previously set in association with each block; and sixth judging means for judging the genuineness of the paper by comparing positive peak and negative peak appearance patterns in each block determined by the peak value analyzing means with positive peak and negative peak appearance reference patterns previously set in association with each block.

2. A paper discriminating device according to claim 1, wherein in a case where the measured data read by the measured data reading means are decreasing in value, the peak value analyzing means identifies as measured data characteristic of the negative peak the measured data stored for an immediately previous measured position when the measured data read by the measured data reading means is greater than the measured data stored in the measured data storage means for the immediately previous measured position and when a difference between the measured data read by the measured data reading means and the measured data stored for the immediately previous measured position is greater than a previously set value, and wherein in a case where the measured data read by the measured data reading means are increasing in value, the peak value analyzing means identifies as measured data characteristic of the positive peak the measured data for the immediately previous measured position when the measured data read by the measured data reading means is smaller than the measured data stored in the measured data storage means for the immediately previous measured position and when a difference between the measured data read by the measured data reading means and the measured data for the immediately previous measured position is greater than the previously set value.

3. A paper discriminating device according to claim 1, wherein the sixth judging means comprises:

appearance reference pattern storage means for storing the positive peaks appearing in each block in order of greater size of its data together with their appearance positions, and storing the negative peak data in order of smaller size of its data together with their appearance positions; and comparing means for sorting the positive peaks in each block determined by the peak value analyzing means in order of greater size of its measured data and the negative peaks in order of smaller size of its measured data, and comparing the measurement positions of the positive and negative peaks with the appearance positions of the positive and negative peaks stored in the appearance reference pattern storage means.

* * * * *